United States Patent
Liu et al.

(10) Patent No.: US 8,300,187 B2
(45) Date of Patent: Oct. 30, 2012

(54) REFLECTIVE LIQUID CRYSTAL DISPLAY DEVICE AND MANUFACTURING METHOD THEREOF

(75) Inventors: Sheng-Fa Liu, Hsinchu County (TW);
Yu-Hsien Chen, Kaohsiung (TW);
Bao-Sian Ciou, New Taipei (TW);
Chun-Yu Shen, Changhua County (TW); Huai-An Li, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 113 days.

(21) Appl. No.: 13/074,025

(22) Filed: Mar. 29, 2011

(65) Prior Publication Data
US 2012/0212695 A1    Aug. 23, 2012

(30) Foreign Application Priority Data
Feb. 21, 2011   (TW) .................................. 100105609

(51) Int. Cl.
*G02F 1/1335* (2006.01)
*G02F 1/1337* (2006.01)
*C09K 19/02* (2006.01)

(52) U.S. Cl. ........................ 349/113; 349/123; 349/185

(58) Field of Classification Search .................. None
See application file for complete search history.

(56) References Cited

U.S. PATENT DOCUMENTS

| 6,753,937 B2 * | 6/2004 | Grupp ........................... 349/110 |
| 6,999,142 B2 | 2/2006 | Stephenson |
| 2002/0109812 A1 * | 8/2002 | Takami et al. ................ 349/113 |

FOREIGN PATENT DOCUMENTS

| CN | 101750829 A | 6/2010 |
| JP | 2008052152 | 3/2008 |
| TW | I324632 | 5/2010 |

* cited by examiner

*Primary Examiner* — Wen-Ying P Chen
(74) *Attorney, Agent, or Firm* — Winston Hsu; Scott Margo

(57) ABSTRACT

A reflective liquid crystal display device includes a first substrate, a second substrate, a liquid crystal layer, a first alignment layer, and a second alignment layer. The first substrate and the second substrate are disposed oppositely to each other. The liquid crystal layer is disposed between the first substrate and the second substrate. The liquid crystal layer includes a plurality of liquid crystal molecules for reflecting light within a wavelength range and allowing light beyond the wavelength range to pass through. The second alignment layer is disposed on an inner side of the first substrate facing the second substrate, and the second alignment layer is employed to absorb the light passing through the liquid crystal layer and align the liquid crystal molecules.

10 Claims, 8 Drawing Sheets

REFLECTIVE LIQUID CRYSTAL DISPLAY DEVICE AND MANUFACTURING METHOD THEREOF

BACKGROUND OF THE INVENTION

1. Field of the Invention

The present invention relates to a reflective liquid crystal display device and a manufacturing method thereof, and more particularly, to a reflective liquid crystal display device with a black alignment layer and a manufacturing method thereof.

2. Description of the Prior Art

Compact designs and low power consumptions may be realized in reflective liquid crystal display devices because backlight units are not required for the reflective liquid crystal display. Among all kinds of liquid crystals, the cholesteric liquid crystal is suitable for the low power consumption reflective liquid crystal display device because the cholesteric liquid crystal may be employed to selectively reflect light within a wavelength range and kept in a bistable state when applied voltages are removed.

For analyzing the display mechanism of the cholesteric liquid crystal display device, please refer to FIGS. 1A-1C. FIGS. 1A-1C are schematic diagrams illustrating different display modes of the reflective cholesteric liquid crystal display device according to a prior art. FIG. 1A is a schematic diagram illustrating the reflective cholesteric liquid crystal display device in a planar state without voltages applied. FIG. 1B is a schematic diagram illustrating the reflective cholesteric liquid crystal display device in a homeotropic state with voltages applied. FIG. 1C is a schematic diagram illustrating the reflective cholesteric liquid crystal display device in a focal conic state when the applied voltages are removed. As shown in FIG. 1A, a plurality of cholesteric liquid crystal molecules 14M are disposed on a substrate 301 and disposed between a first pixel electrode 161 and a second pixel electrode 162. When there are no voltages applied to the first pixel electrode 161 and the second pixel electrode 162, the cholesteric liquid crystal molecules 14M are preserved in the planar state. The cholesteric liquid crystal molecules 14M may selectively reflect light within a wavelength range and allow light beyond the wavelength range to pass through in the planar state. As shown in FIG. 1A, an incident light C includes an incident light A and an incident light B. A wavelength range of the incident light A is different from a wavelength range of the incident light B. A transmissive light AT may be generated by the incident light A passing through the cholesteric liquid crystal molecules 14M. A reflected light BR may be generated by the incident light B reflected by the cholesteric liquid crystal molecules 14M, and then a bright state display effect is presented within the wavelength range of the reflected light BR. When a voltage bias, which is capable of driving the cholesteric liquid crystal molecules 14M into the homeotropic state, is applied between the first pixel electrode 161 and the second pixel electrode 162, as shown in FIG. 1B, the voltage bias may drive the cholesteric liquid crystal molecules into the homeotropic state, and a dark state display effect is presented because the incident light C completely passes though the cholesteric liquid crystal molecules 14M to form a transmissive light CT. As shown in FIG. 1C, when the voltage bias between the first pixel electrode 161 and the second pixel electrode 162 is removed, the cholesteric liquid crystal molecules 14M are driven into the focal conic state, and the dark state display effect is still presented because the incident light C may be scattered by the cholesteric liquid crystal molecules 14M to form scattered lights CD. However, when the substrate 301 in the reflective cholesteric liquid crystal display device is an array substrate with metal patterns, the substrate 301 may reflect light. As shown in FIGS. 1A-1C, the transmissive light AT, the transmissive light CT, and the scattered light CD may be reflected by the substrate 301 and then a reflected light AR, a reflected light CR, and a reflected light DR are generated. The reflected light AR may interfere with the reflected light BR in the bright state display mode, and then affects the color purity of the reflective cholesteric liquid crystal display device. The reflected light CR and the reflected light DR may induce light leakage issue in the dark state display mode, and then affects the contrast ratio of the reflective cholesteric liquid crystal display device.

In conventional reflective cholesteric liquid crystal display devices, a black absorption layer is generally disposed on a surface of the substrate to absorb the transmissive light and the scattered light passing through the cholesteric liquid crystal molecules and reduce the influence on the color purity and the contrast ratio of the reflective cholesteric liquid crystal display device. However, some area of the substrate may not be covered by the black absorption layer for positioning function in subsequent module process. Therefore, in the conventional related art, a process for forming the black absorption layer and an additional process for patterning the black absorption layer are both required. The complexity of the manufacturing process may then increase and affect the yield performance and the cost of the reflective cholesteric liquid crystal display device.

SUMMARY OF THE INVENTION

It is one of the objectives of the present invention to provide a reflective liquid crystal display device and a manufacturing method thereof. A black alignment layer is employed in the reflective liquid crystal display device for absorbing the transmissive light to enhance the contrast ratio and the color purity of the reflective liquid crystal display device and simplifying the manufacturing process of the reflective liquid crystal display device.

According to a preferred embodiment of the present invention, a reflective liquid crystal display device includes a first substrate, a second substrate, a liquid crystal layer, a first alignment layer, and a second alignment layer. The first substrate and the second substrate are disposed oppositely to each other. The liquid crystal layer is disposed between the first substrate and the second substrate. The liquid crystal layer includes a plurality of liquid crystal molecules for reflecting light within a wavelength range and allowing light beyond the wavelength range to pass through. The first alignment layer is disposed on an inner side of the second substrate facing the first substrate, and the first alignment layer is employed to align the liquid crystal molecules. The second alignment layer is disposed on an inner side of the first substrate facing the second substrate, and the second alignment layer is employed to absorb the light passing through the liquid crystal layer and align the liquid crystal molecules.

According to a preferred embodiment of the present invention, a manufacturing method of reflective liquid crystal display device includes the following steps. Firstly, a first substrate and a second substrate are provided. A first alignment layer is formed on the second substrate. A second alignment layer is formed on the first substrate. A liquid crystal layer is formed between the first alignment layer and the second alignment layer. The liquid crystal layer includes a plurality of liquid crystal molecules. The liquid crystal molecules are capable of reflecting light within a wavelength range and allowing light beyond the wavelength range to pass through.

The second alignment layer is employed to absorb light and align the liquid crystal molecules.

In the present invention, the alignment layer and the light absorption layer are combined into one layer for absorbing the transmissive light to enhance the contrast ratio and the color purity of the reflective liquid crystal display device and simplifying the manufacturing process of the light absorption layer. The process reduction purpose for the reflective liquid crystal display device may then be achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
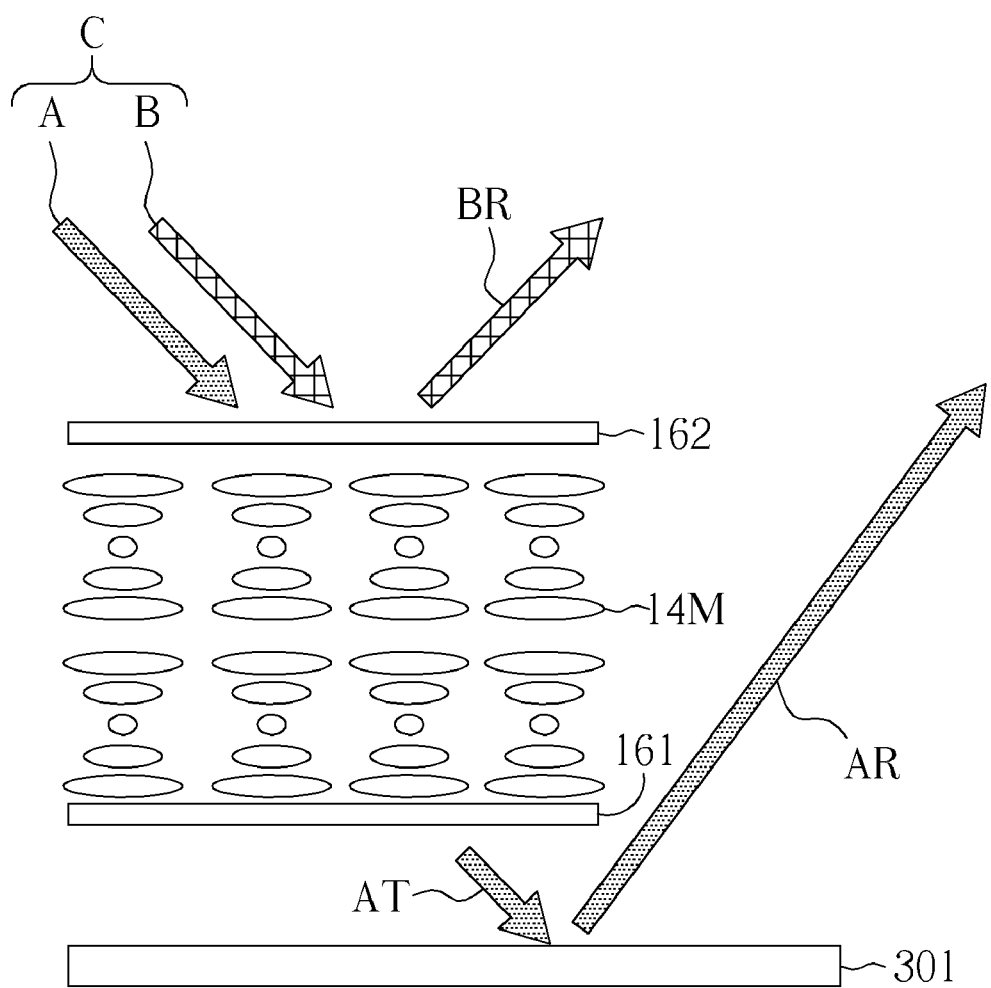
FIGS. 1A-1C are schematic diagrams illustrating different display modes of the reflective cholesteric liquid crystal display device according to a prior art.
Figure 1B:
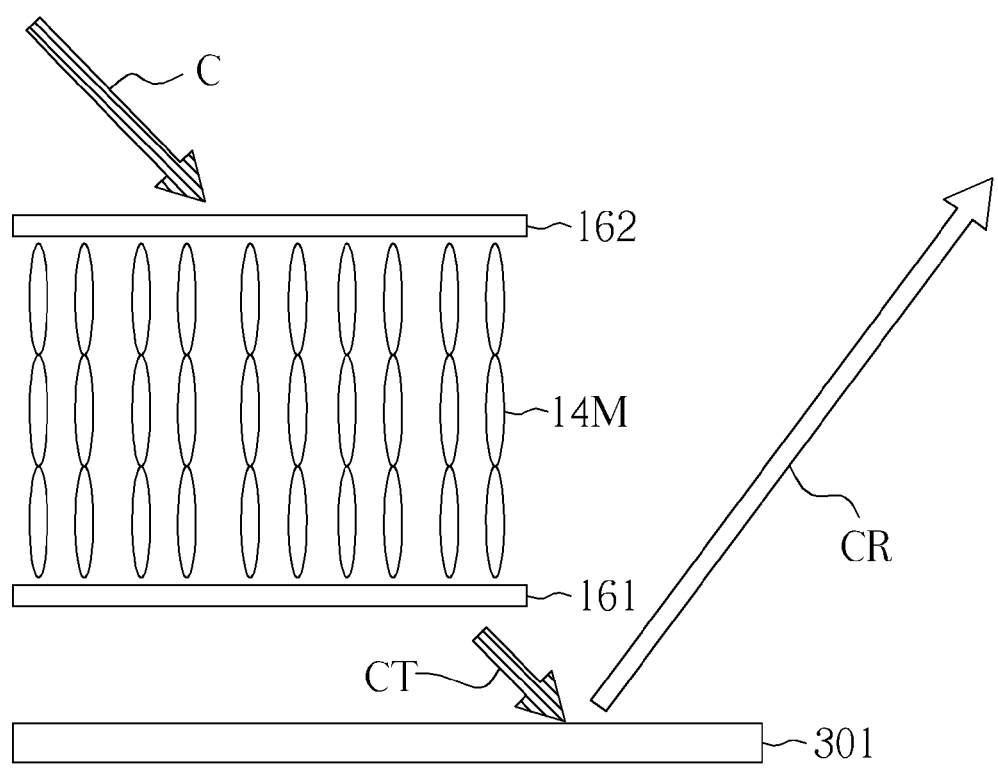
Figure 1C:
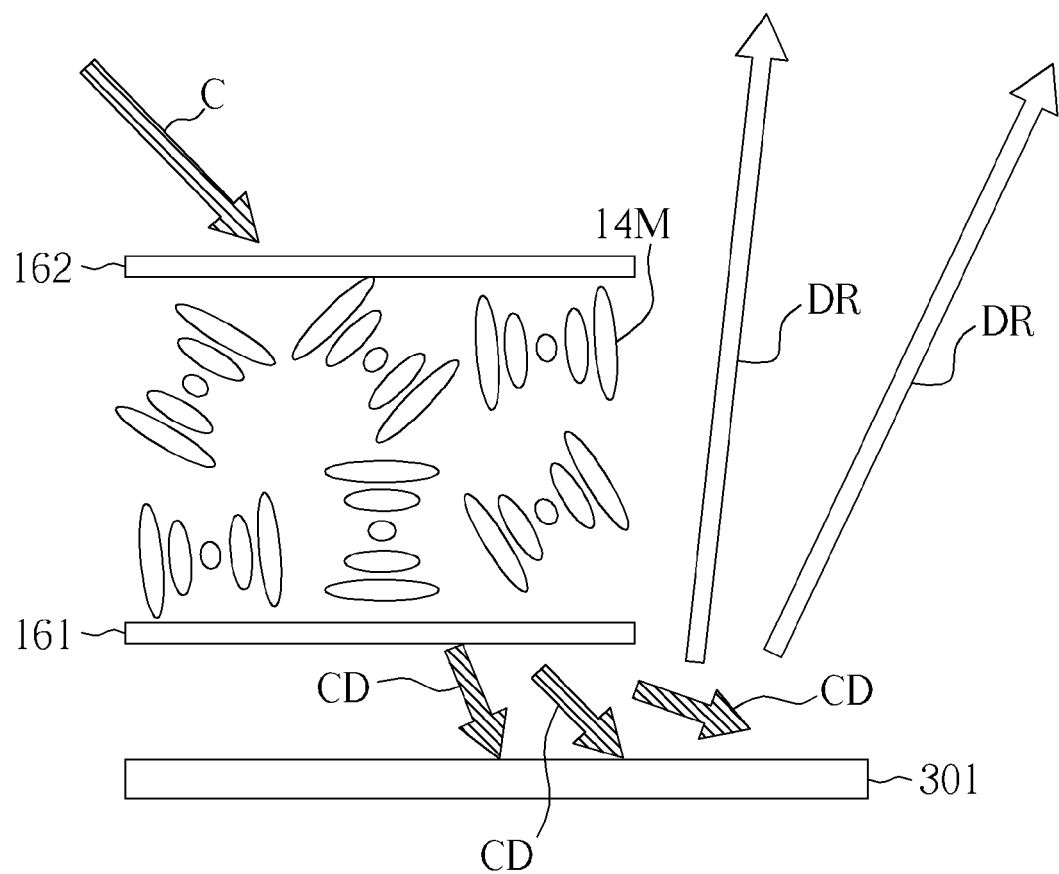

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "include" are used in an open-ended fashion, and thus should be interpreted to mean "include, but not limited to . . . " In addition, to simplify the descriptions and make it more convenient to compare between each embodiment, identical components are marked with the same reference numerals in each of the following embodiments. Please note that the figures are only for illustration and the figures may not be to scale. Additionally, the terms such as "first" and "second" in this context are only used to distinguish different components and do not constrain the order of generation.

Figure 2:
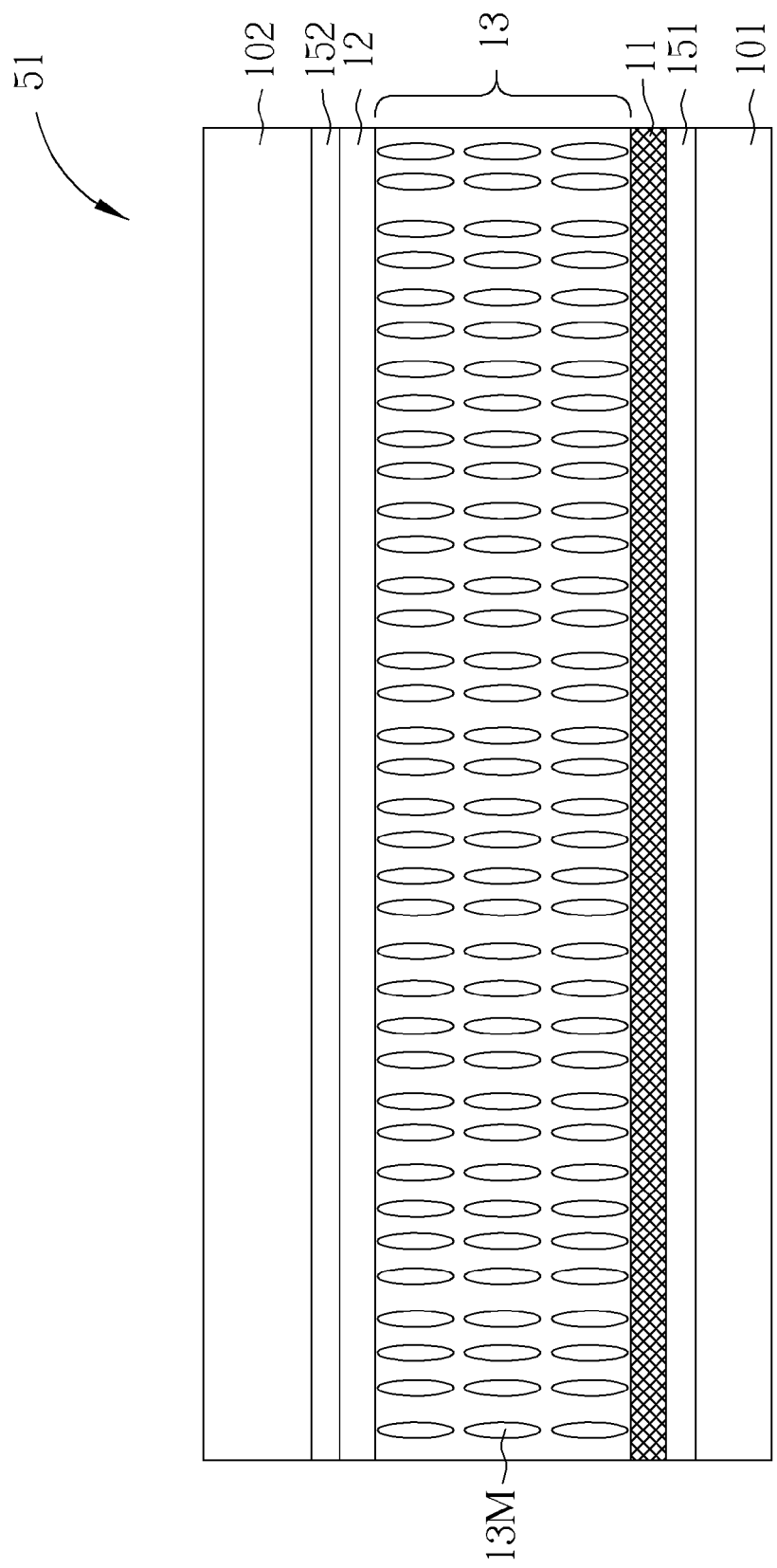
FIG. 2 is a schematic diagram illustrating a cross-sectional view of the reflective liquid crystal display device according to a preferred embodiment of the present invention.

Please refer to FIG. 2. FIG. 2 is a schematic diagram illustrating a cross-sectional view of the reflective liquid crystal display device according to a preferred embodiment of the present invention. As shown in FIG. 2, in the present invention, a reflective liquid crystal display device 51 includes a first substrate 101, a second substrate 102, a liquid crystal layer 13, a first alignment layer 12, and a second alignment layer 11. The first substrate 101 and the second substrate 102 are disposed oppositely to each other. The liquid crystal layer 13 is disposed between the first substrate 101 and the second substrate 102. The liquid crystal layer 13 includes a plurality of liquid crystal molecules 13M. The liquid crystal molecules 13M are capable of reflecting light within a wavelength range and allowing light beyond the wavelength range to pass through. In this embodiment, the liquid crystal molecules 13M include cholesteric liquid crystal molecules or other appropriate liquid crystal molecules with reflective properties. The first alignment layer 12 is disposed on an inner side of the second substrate 102 facing the first substrate 101. The first alignment layer 12 is capable of aligning the liquid crystal molecules 13M. The second alignment layer 11 is disposed on an inner side of the first substrate 101 facing the second substrate 102. The second alignment layer 11 is capable of absorbing light and aligning the liquid crystal molecules 13M. In addition, the reflective liquid crystal display device 51 in this embodiment may further include a plurality of first pixel electrodes 151 and a plurality of second pixel electrodes 152. The first pixel electrodes 151 are disposed between the first substrate 101 and the second alignment layer 11, and the second pixel electrodes 152 are disposed between the second substrate 102 and the first alignment layer 12. The first pixel electrodes 151 and the second pixel electrodes 152 are employed to drive the liquid crystal molecules 13M into different alignment states for presenting different display effects. In this embodiment, the first substrate 101 includes an array substrate or other appropriate substrates which may be used to regionally control the liquid crystal molecules 13M for different display effects.

Figure 3A:
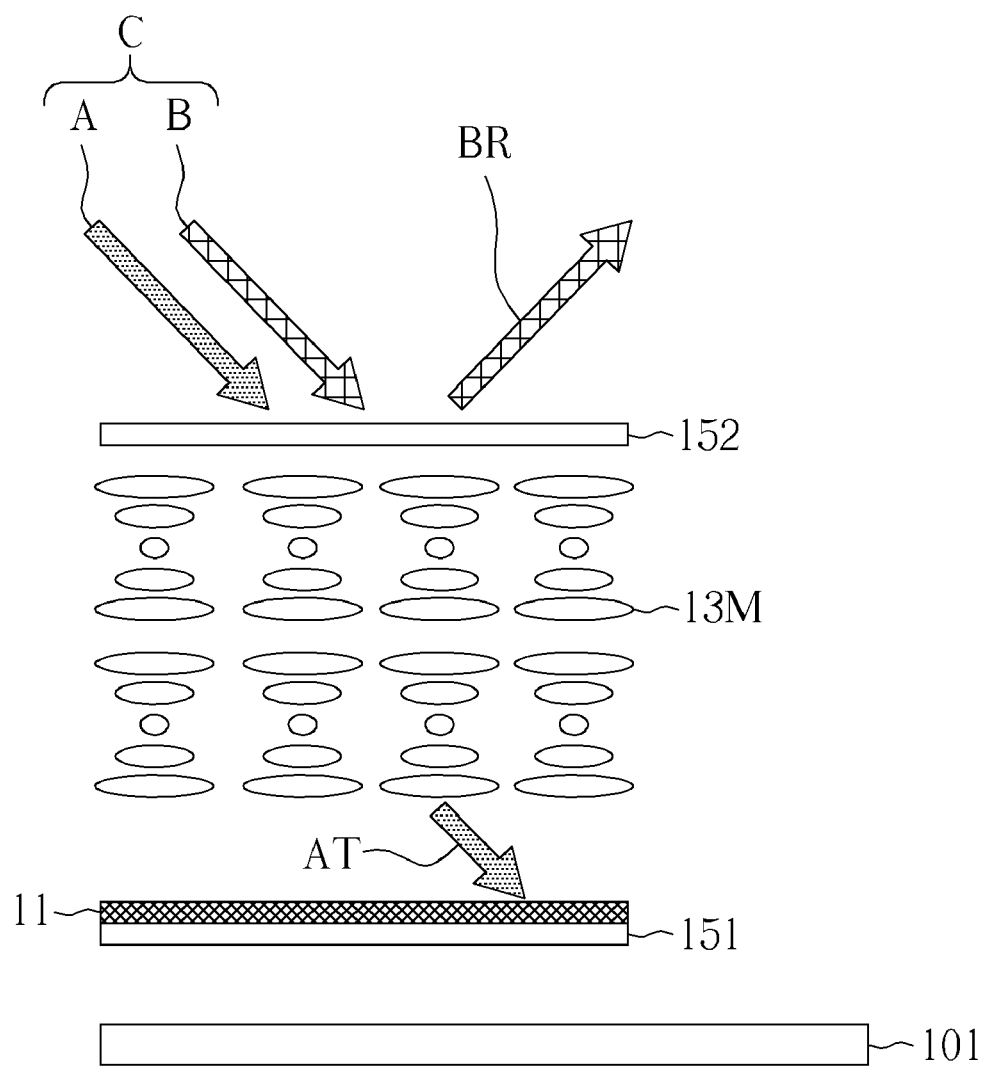
FIGS. 3A-3C are schematic diagrams illustrating different display modes of the reflective liquid crystal display device according to a preferred embodiment of the present invention.
Figure 3B:
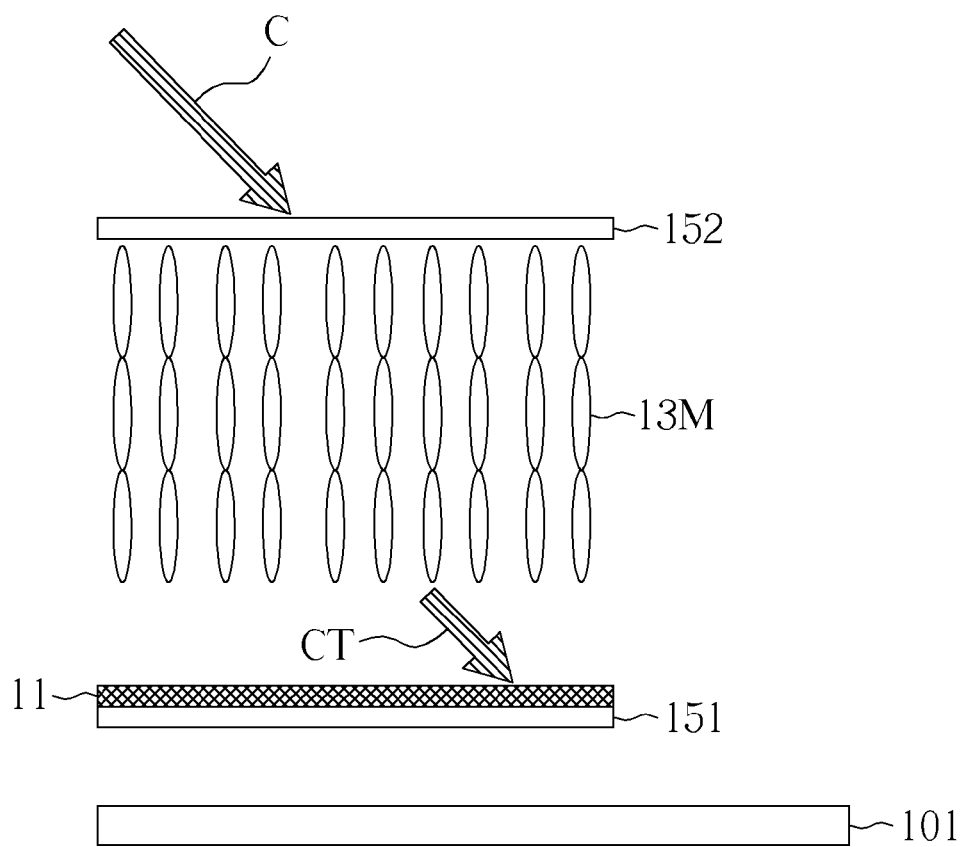
Figure 3C:
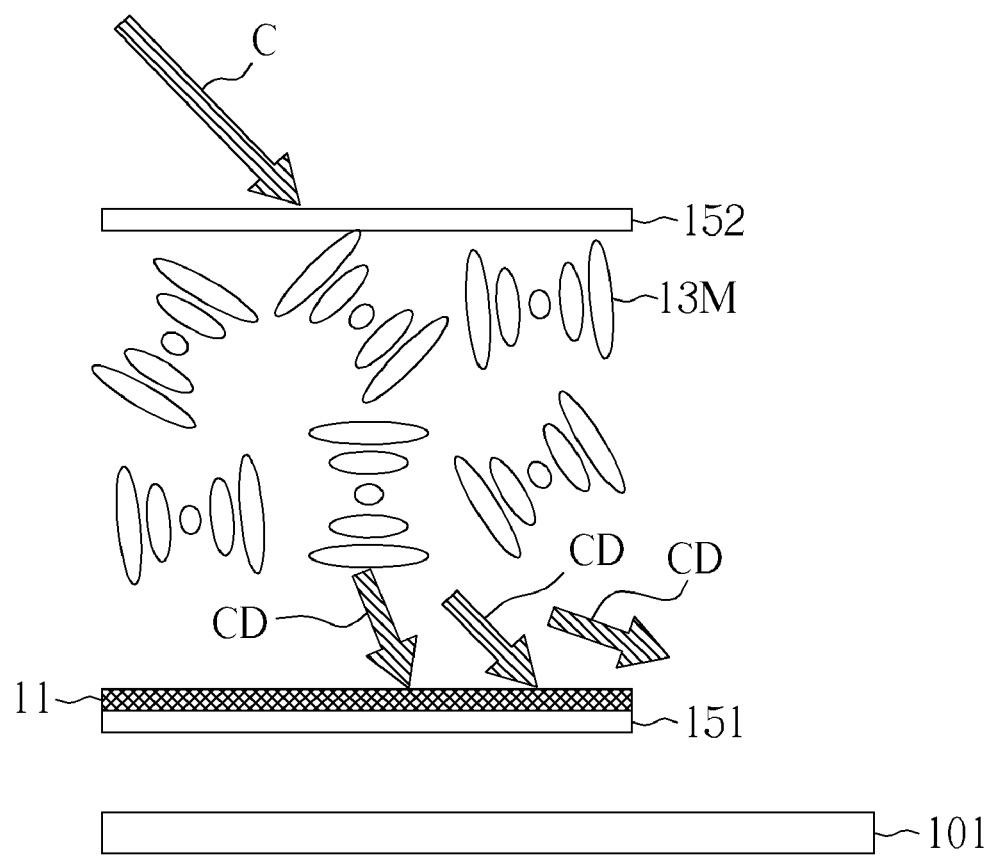

Please refer to FIGS. 3A-3C. FIGS. 3A-3C are schematic diagrams illustrating different display modes of the reflective liquid crystal display device according to a preferred embodiment of the present invention. FIG. 3A is a schematic diagram illustrating a display condition of the liquid crystal molecules 13M in a planar state. FIG. 3B is a schematic diagram illustrating a display condition of the liquid crystal molecules 13M in a homeotropic state. FIG. 3C is a schematic diagram illustrating a display condition of the liquid crystal molecules 13M in a focal conic state. As shown in FIGS. 3A-3C, the second alignment layer 11 is disposed between the first pixel electrode 151 and the liquid crystal molecules 13M. When there are no voltages applied to the first pixel electrode 151 and the second pixel electrode 152, the liquid crystal molecules 13M are preserved in the planar state. In the planar state, the liquid crystal molecules 13M may reflect light within a wavelength range and allow light beyond the wavelength range to pass through. As shown in FIG. 3A, an incident light C includes an incident light A and an incident light B, and a wavelength range of the incident light A is different from a wavelength range of the incident light B. A transmissive light AT may be generated by the incident light A passing through the liquid crystal molecules 13M. A reflected light BR may be generated by the incident light B reflected by the liquid crystal molecules 13M, and a bright state display effect is then presented within the wavelength range of the reflected light BR. In this invention, properties of the liquid crystal molecules may be modified to selectively reflect light within different wavelength ranges for different bright state display effect. For example, when a wavelength range of the light which may be reflected by the liquid crystal molecules 13M is between 620 nm to 750 nm, light beyond the wavelength range may pass through the liquid crystal molecules 13M and light within the wavelength range may be reflected to present a red display effect. When the wavelength range of the light which may be reflected by the liquid crystal molecules 13M is between 495 nm to 570 nm, light beyond the wavelength range may pass through the liquid crystal molecules 13M and light within the wavelength range may be reflected to present a green display effect. When the wavelength range of the light which may be reflected by the liquid crystal molecules 13M is between 450 nm to 495 nm, light beyond the wavelength range may pass through the liquid crystal molecules 13M and light within the wavelength range may be reflected to present a blue display effect. As shown in FIG. 3A, in this embodiment, the transmissive light AT may be absorbed by the second alignment layer 11 and may not be reflected to interfere with the reflected light BR in a bright state display mode. Additionally, when a voltage bias, which is capable of driving the liquid crystal molecules 13M into the homeotropic state, is applied between the first pixel electrode 151 and the second pixel electrode 152, as shown in FIG. 3B, the voltage bias may drive the liquid crystal molecules 13M into the homeotropic state, and a dark state display effect is then presented because the incident light C completely passes though the liquid crystal molecules 13M to form a transmissive light CT. In this embodiment, the transmissive light CT may be absorbed by the second alignment layer 11 and may not be reflected to induce light leakage issue in a dark state display mode. Subsequently, when the voltage bias between the first pixel electrode 151 and the second pixel electrode 152 is removed, as shown in FIG. 3C, the liquid crystal molecules 13M are driven into the focal conic state, and the dark state display effect is still presented because the incident light C may be scattered by the liquid crystal molecules 13M to form scattered lights CD. Additionally, in this embodiment, the second alignment layer 11 may include liquid crystal aligning materials mixed with black dyes or other appropriate low reflective materials. The black dyes may include dichroic black dyes in the order of nanometers or other appropriate black dyes in small molecules. Preferably, a concentration of the black dyes in the second alignment layer 11 may be controlled between 1% and 10% for effectively enhancing an optical density of the second alignment layer 11 to a level greater than 2.5 without affecting the aligning performance of the second alignment layer 11, and then the transmissive lights and the scatter lights may be effectively absorbed to enhance the contrast ratio and the color purity of the reflective liquid crystal display device. It is worth noticing that the concentration of the black dyes mixed in the second alignment layer 11 and the optical density of the second alignment layer 11 are not limited to the above-mentioned values.

Figure 4:
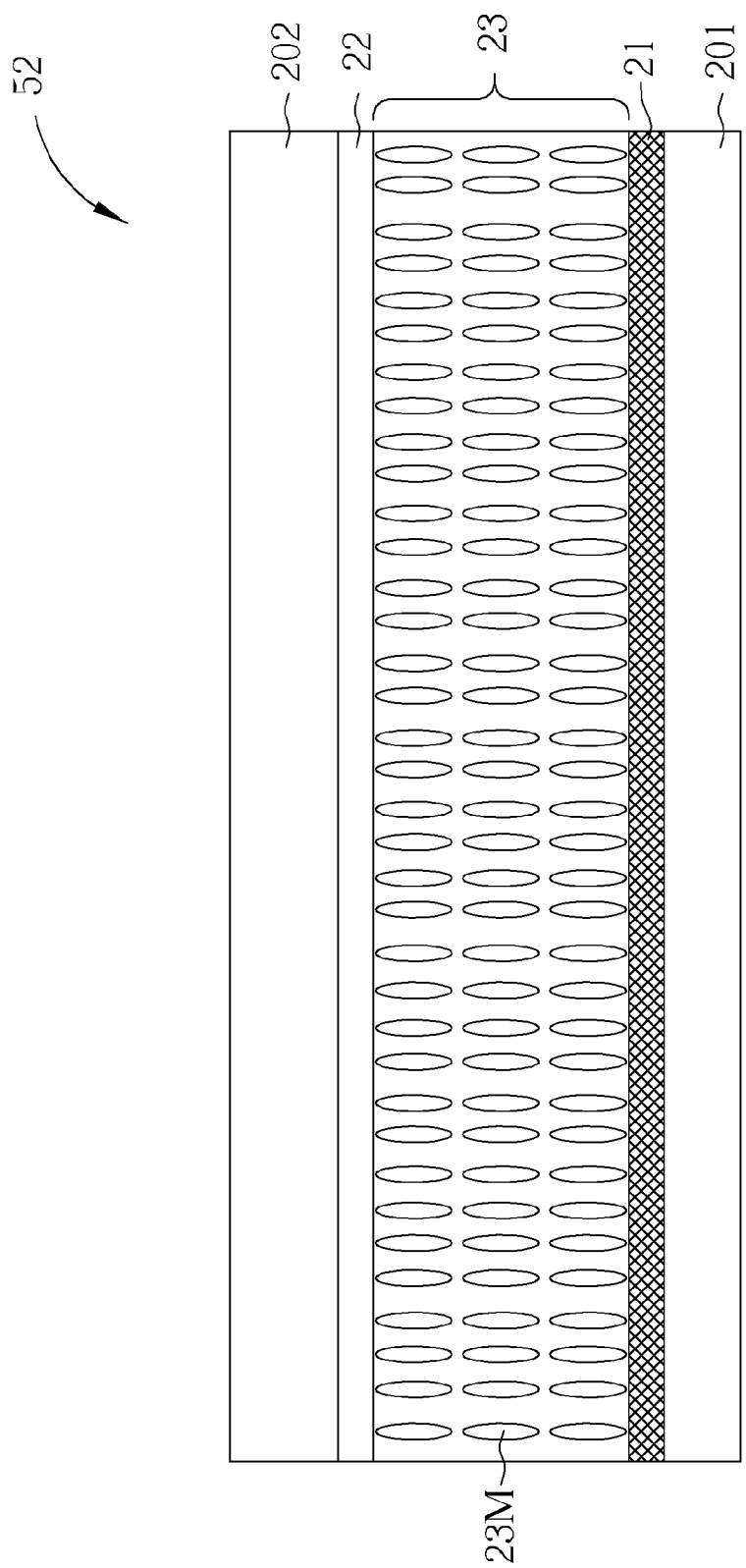
FIG. 4 is a schematic diagram illustrating a manufacturing method of the reflective liquid crystal display device according to another preferred embodiment of the present invention.

Please refer to FIG. 4. FIG. 4 is a schematic diagram illustrating a manufacturing method of the reflective liquid crystal display device according to another preferred embodiment of the present invention. As shown in FIG. 4, according to another preferred embodiment of the present invention, a manufacturing method of the reflective liquid crystal display device 52 includes the following steps. Firstly, a first substrate 201 and a second substrate 202 are provided. A first alignment layer 22 is then formed on the second substrate 202. A second alignment layer 21 is then formed on the first substrate 201. A liquid crystal layer 23 is formed between the first alignment layer 22 and the second alignment layer 21. The liquid crystal layer 23 includes a plurality of liquid crystal molecules 23M. The liquid crystal molecules 23M are capable of reflecting light within a wavelength range and allowing light beyond the wavelength range to pass through. The second alignment layer 21 is capable of absorbing light and aligning the liquid crystal molecules 23M. In this embodiment, the liquid crystal molecules 23M include cholesteric liquid crystal molecules or other appropriate liquid crystal molecules with reflective properties. Methods of forming the liquid crystal layer 23 include the conventional injection approach, the one drop filling (ODF) approach, and other appropriate installation approaches. A concentration of black dyes mixed in the second alignment layer 21 may be preferably controlled between 1% and 10% for effectively enhancing an optical density of the second alignment layer 21 to a level greater than 2.5 without affecting the aligning performance of the second alignment layer 21, and transmissive lights and scatter lights may then be effectively absorbed to enhance the contrast ratio and the color purity of the reflective liquid crystal display device 52. Additionally, it is worth noticing that additional photo-etching processes are required for patterning a black absorption layer in the conventional reflective liquid crystal display device, but in the present invention, the second alignment layer 21 may be formed by imprint lithography and patterned by a printing plate, such as an APR plate, in the same process. The process reduction purpose for the reflective liquid crystal display device may then be achieved.

To summarize all the descriptions above, in the present invention, the appropriate black dyes and the appropriate concentration of the black dyes in the alignment layer are selected and employed to make the alignment layer capable of absorbing light and aligning the liquid crystal molecules. The transmissive lights and the scattered lights passing through the liquid crystal layer in the reflective liquid crystal display device may be effectively absorbed by the alignment layer for enhancing the contrast ratio and the color purity of the reflective liquid crystal display device. Meanwhile, according to the design of the black alignment layer in the present invention, additional processes for forming and patterning the black absorption layer are not required, and the purposes of process reduction, cost down, and yield enhancement may then be achieved.

Those skilled in the art will readily observe that numerous modifications and alterations of the device and method may be made while retaining the teachings of the invention.

What is claimed is:

1. A reflective liquid crystal display device, comprising:
   a first substrate;
   a second substrate, disposed oppositely to the first substrate;
   a liquid crystal layer, disposed between the first substrate and the second substrate, the liquid crystal layer comprising a plurality of liquid crystal molecules for reflecting light within a wavelength range and allowing light beyond the wavelength range to pass through;
   a first alignment layer, disposed on an inner side of the second substrate facing the first substrate, wherein the first alignment layer is employed to align the liquid crystal molecules; and
   a second alignment layer, disposed on an inner side of the first substrate facing the second substrate, wherein the second alignment layer is employed to absorb the light passing through the liquid crystal layer and align the liquid crystal molecules.

2. The reflective liquid crystal display device of claim 1, wherein the liquid crystal molecules include cholesteric liquid crystal molecules.

3. The reflective liquid crystal display device of claim 1, wherein an optical density of the second alignment layer is larger than 2.5.

4. The reflective liquid crystal display device of claim 1, wherein the second alignment layer comprises black dyes, and a concentration of the black dyes in the second alignment layer is between 1% and 10%.

5. The reflective liquid crystal display device of claim 4, wherein the black dyes include dichroic black dyes.

6. The reflective liquid crystal display device of claim 1, wherein the first substrate includes an array substrate.

7. A manufacturing method of a reflective liquid crystal display device, comprising:

providing a first substrate and a second substrate;

forming a first alignment layer on the second substrate;

forming a second alignment layer on the first substrate; and forming a liquid crystal layer between the first alignment layer and the second alignment layer, wherein the liquid crystal layer comprises a plurality of liquid crystal molecules, the liquid crystal molecules are capable of reflecting light within a wavelength range and allowing light beyond the wavelength range to pass through, and the second alignment layer is employed to absorb light and align the liquid crystal molecules.

8. The manufacturing method of the reflective liquid crystal display device of claim 7, wherein the liquid crystal molecules include cholesteric liquid crystal molecules.

9. The manufacturing method of the reflective liquid crystal display device of claim 7, wherein an optical density of the second alignment layer is larger than 2.5.

10. The manufacturing method of the reflective liquid crystal display device of claim 7, wherein the second alignment layer comprises black dyes, and a concentration of the black dyes in the second alignment layer is between 1% and 10%.

* * * * *